United States Patent
Roffman et al.

(10) Patent No.: US 6,196,685 B1
(45) Date of Patent: *Mar. 6, 2001

(54) METHOD OF DESIGNING AND FITTING MULTIFOCAL LENSES TAKING INTO ACCOUNT MATERIAL PROPERTIES OF THE LENSES

(75) Inventors: Jeffrey H. Roffman; Timothy R. Poling; Denwood F. Ross, III; James A. Ebel, all of Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/286,094

(22) Filed: Apr. 2, 1999

(51) Int. Cl.[7] ................................................... G02C 7/04
(52) U.S. Cl. ........................ 351/177; 351/160 H; 351/161
(58) Field of Search ................................ 351/160 R, 160 H, 351/161, 162, 177

(56) References Cited

U.S. PATENT DOCUMENTS

| | | | |
|---|---|---|---|
| 5,448,312 | 9/1995 | Roffman et al. | 351/161 |
| 5,485,228 | 1/1996 | Roffman et al. | 351/161 |
| 5,598,234 | 1/1997 | Blum et al. | 351/160 R |
| 5,682,223 | 10/1997 | Menezes et al. | 351/161 |
| 5,691,797 | 11/1997 | Poster et al. | 351/161 |
| 5,715,031 | 2/1998 | Roffman et al. | 351/161 |
| 5,847,802 | * 12/1998 | Menezes et al. | 351/177 |

FOREIGN PATENT DOCUMENTS 1 463 107   2/1977   (GB).

OTHER PUBLICATIONS

"Using Corneal Topography" Contact Lens Spectrum, Mar. 1999, pp. 13–15.

* cited by examiner

Primary Examiner—Scott J. Sugarman

(57) ABSTRACT

A method for fitting and designing an ophthalmic lens for a presbyope that yields improved visual acuity in general, and takes into account individual fitting characteristics. More specifically, a method for fitting and designing a contact or intraocular lens which takes into account material properties of the lens by observing the "print through" associated with the lens as an indicator of the topography of the lens. The term "print through" is used to refer to any change in lens topography on the front surface of the lens as a result of changes in topography on the back surface of the lens. If a significant amount of "print through" is observed, this generally indicates that the multifocal function of the lens is properly being performed. In such a situation, the clinician can then adjust the add power to the desired level. If there is not a significant amount of "print through", this generally indicates that the multifocal function of the lens is not properly being performed. In this latter situation, by observing the reduced "print through" associated with such a lens, the clinician can instead bias one lens of a lens pair for distance power and the other lens of a lens pair for near power. Alternatively, each lens of the lens pair can be biased for some combination of distance power and near power.

17 Claims, 7 Drawing Sheets

METHOD OF DESIGNING AND FITTING MULTIFOCAL LENSES TAKING INTO ACCOUNT MATERIAL PROPERTIES OF THE LENSES

BACKGROUND OF THE INVENTION

1. Field of the Invention

The present invention relates generally to multifocal lens designs. More particularly, the present invention pertains to a method of designing and fitting multifocal lenses taking into account the material properties of the lenses.

2. Discussion of the Prior Art

The present invention pertains to ophthalmic lenses, and in particular to contact lenses such as soft hydrogel contact lenses, and intraocular lenses, having more than one optical power or focal length.

It is well known that as an individual ages, the eye is less able to accommodate. i.e., bend the natural lens in the eye in order to focus on objects that are relatively near to the observer. This condition is referred to as presbyopia, and presbyopes have in the past relied upon spectacles or other lenses having a number of different regions with different optical powers to which the wearer can shift his vision in order to find the appropriate optical power for the object or objects upon which the observer wishes to focus.

With spectacles, the process involves shifting one's field of vision from typically an upper lens portion far power to a lower lens portion near power. With soft or hydrogel contact lenses, however, this approach has been less than satisfactory. The contact lens, working in conjunction with the natural lens. forms an image on the retina of the eye by focusing light incident on each part of the cornea from different field angles onto each part of the retina in order to form an image. This is demonstrated by the fact that as the pupil contracts in response to brighter light, the image on the retina does not shrink, but rather, light comes through a smaller area of the lens to form the entire image.

Similarly, for a person that has had the natural lens of the eye removed because of a cataract condition and an intraocular lens inserted as a replacement, the ability to adjust the lens (accommodate) the distance of the object being viewed is totally absent. In this case, the lens provided is usually set at a single infinite distance focal power, and spectacles are worn to provide the additional positive optical power needed for in-focus closer vision. For such a patient, a functional multifocal lens would be particular useful.

It is also known in the art that under certain circumstances the brain can discriminate between separate competing images by accepting an in-focus image and rejecting an out-of-focus image.

U.S. Pat. No. 5,448,312 entitled PUPIL TUNED MULTIFOCAL OPHTHALMIC LENS, discloses a multifocal concentric ophthalmic lens for presbyopic patients constructed with three general annular lens portions in a multifocal design. A central circular portion of the lens has only the patient's distance corrective power, and is surrounded by a first inner annular portion, which can consist of multiple annular rings having an inner radial portion which enhances the patient's near focal power encircled by radial portions of substantially equal cumulative amounts of distance and near optical power focal correction for the patient. This is surrounded by a second outer annular portion, which can also consist of one or more annular rings having additional distance focal power near the periphery of the optical surface area of the ophthalmic lens. Each annular ring has either a near or distance optical power and works in combination with other lens portions to yield the desired focal ratio in that portion of the lens.

U.S. Pat. No. 5,485,228, entitled MULTIFOCAL OPHTHALMIC LENS PAIR, discloses a pair of ophthalmic lenses both containing at least two optical powers, one for near vision and one for distance vision. Both lenses, however, contain the distance power in the center portion of the lens. In one embodiment, the remainder of the lens includes annular portions, each made of one or more optical zones to provide the desired combined, cumulative ratio of near and distance focal length areas at each pupil diameter. In this way, the center portion of the vision contains a single optical power which results in improved visual acuity. This distance portion in the center is particularly well suited to the real world situation of requiring distance vision under high illumination situations.

The patents referred to above are hereby incorporated by reference in their entirety.

In prior art lens designs, no allowance is typically made in the lens design for individual fitting characteristics. As a result, whether or not a lens is successful depends on whether or not a proper fit is achieved. Because no allowance is made for individual fit, not all lenses are properly fitted.

SUMMARY OF THE INVENTION

It is an object, therefore, of the present invention to provide a method for fitting and designing an ophthalmic lens for a presbyope that yields improved visual acuity in general, and takes into account individual fitting characteristics.

The present invention provides a method for fitting and designing a contact or intraocular lens which takes into account material properties of the lens by observing the "print through" associated with the lens as an indicator of the topography of the lens. The term "print through" is used to refer to any change in lens topography on the front surface of the lens as a result of changes in topography on the back surface of the lens. Based on the amount of "print through" observed, the design of the lens may be modified in order to improve the fit and resulting optical effect of the lens.

BRIEF DESCRIPTION OF THE DRAWINGS

The foregoing objects and advantages of the present invention for a method of designing and fitting multifocal lens designs may be more readily understood by one skilled in the art with reference being had to the following detailed description of several preferred embodiments thereof, taken in conjunction with the accompanying drawings wherein like elements are designed by identical reference numerals throughout the several views, and in which.

DETAILED DESCRIPTION OF THE INVENTION

Figure 1:
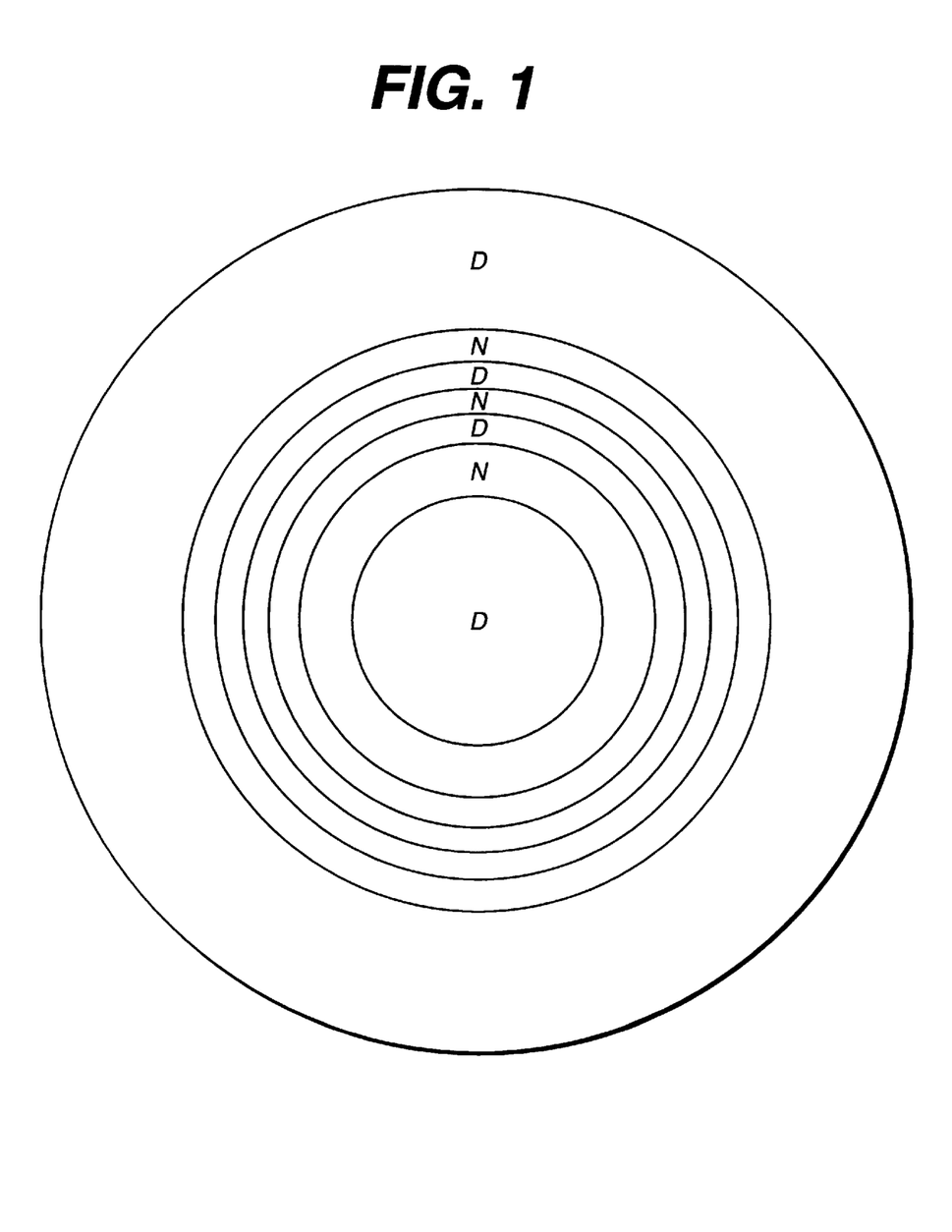
FIG. 1 shows the optical zone of an ophthalmic lens.

FIG. 1 shows the optical zone of an ophthalmic lens having a central area containing the basic prescribed Rx spherical distance power, along with a plurality of alternating spherical near power and spherical distance power annular rings. When the central area and the annular rings are formed on the back surface of the lens, these features "print through" to the front surface of the lens where they appear as attenuated features. The amount of "print through" is a function of several parameters, including the thickness of the lens and other material properties of the lens, such as stiffness and elasticity.

In accordance with the present invention, by observing this "print through" of the back surface features, the lens design can be altered and/or the actual lens fit can be changed. Specifically, if a significant amount of "print through" is observed, this generally indicates that the multifocal function of the lens is properly being performed. In such a situation, the clinician can then adjust the add power to the desired level, either increasing it or decreasing it, and the resulting add power will be implemented with the proper multifocal effect.

In contrast, if there is not a significant amount of "print through", this generally indicates that the multifocal function of the lens is not properly being performed. Loss, or decrease, of the multifocal effect indicates that the lens is performing more like a monofocal lens. In such a situation, by observing the reduced "print through" associated with such a lens, the clinician can instead bias one lens of a lens pair for distance power and the other lens of a lens pair for near power. Alternatively, each lens of the lens pair can be biased for some combination of distance power and near power.

The loss of "print through" effectively places an upper limit on the lens optic zone thickness. Also, by observing the "print through" pattern using a suitable corneal topographer, such as for example, a Keratron Corneal Analyzer available from Optikon 2000, Rome, Italy, it is possible to determine how to vary the fit so as to improve the lens fit and resulting performance, as discussed above. The amount of "print through" may be compared against one or more thresholds to determine whether or not the amount of "print through" is significant. For example, a single threshold may be used, or alternatively, two thresholds may be used. In the latter situation, if the observed amount of "print through" is greater than a first, higher threshold, then an indication is made that the "print through" is significant. Similarly, if the observed amount of "print through" is lower than a second, lower threshold, an indication is made that the "print through" is not significant. Alternatively, a sliding scale or continuum of thresholds may be used. Topographic observation of the "print through" will allow the clinician to decide between various courses of action in lens fitting, such as, for example, changing the distance power, changing the add (i.e., the difference between the distance and near powers), or fitting the lens as a modified monovision lens. Providing the topographic information will also allow the clinician to fit a lens having optimum center thickness, while at the same time still retaining a sufficient amount of "print through".

Figure 2A:
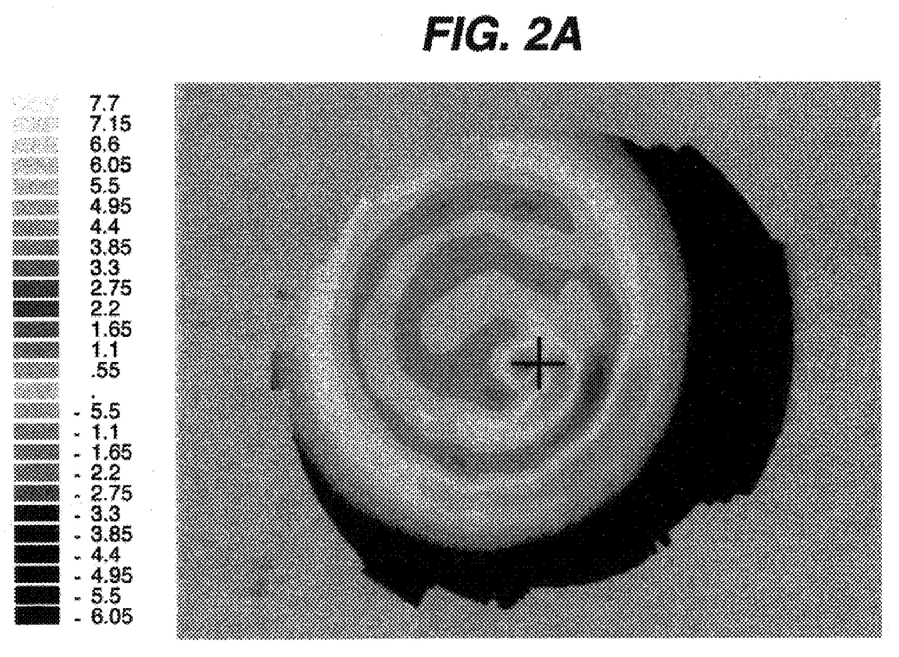
FIGS. 2A–2D illustrate the "print through" associated with a series of progressively thicker lenses.
Figure 2B:
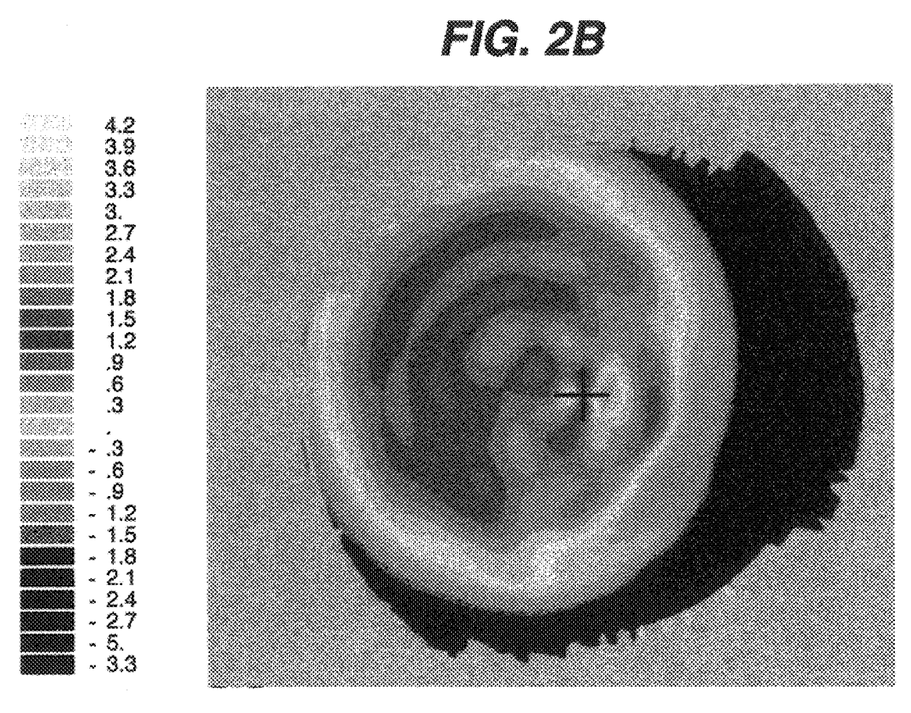
Figure 2C:
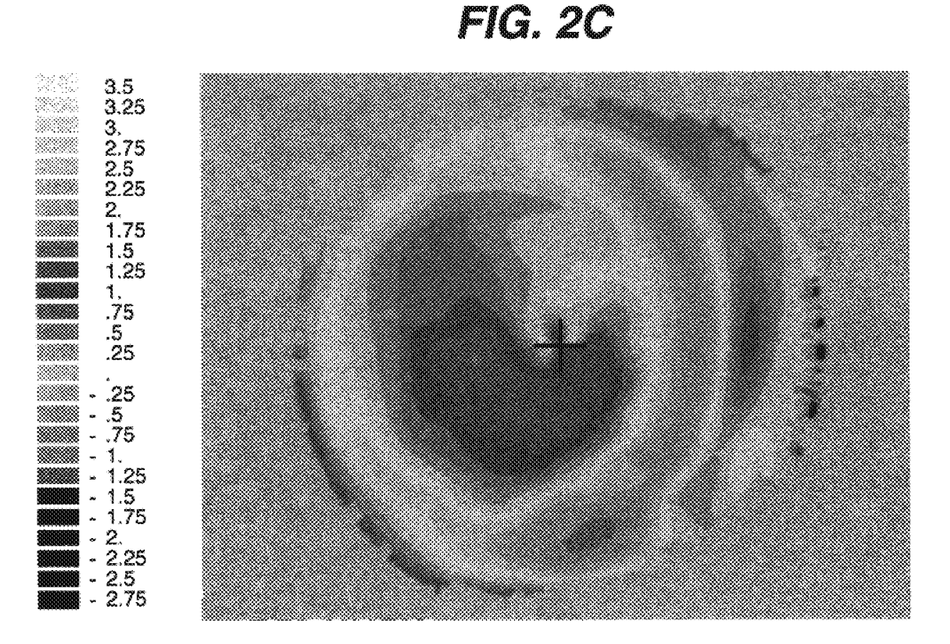
Figure 2D:
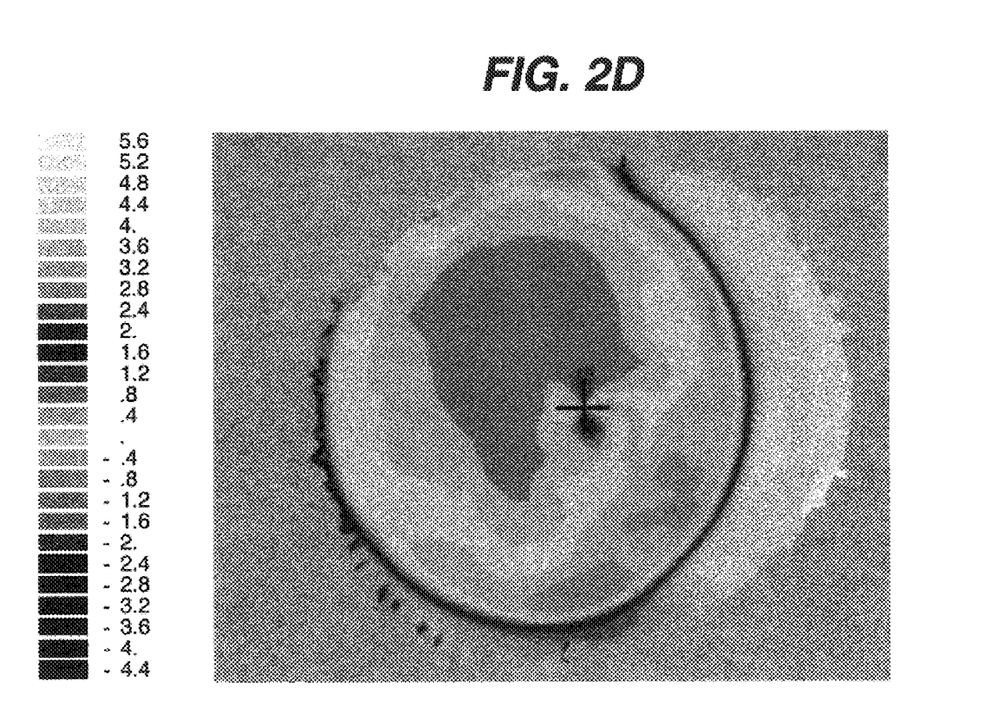
Figure 3A:
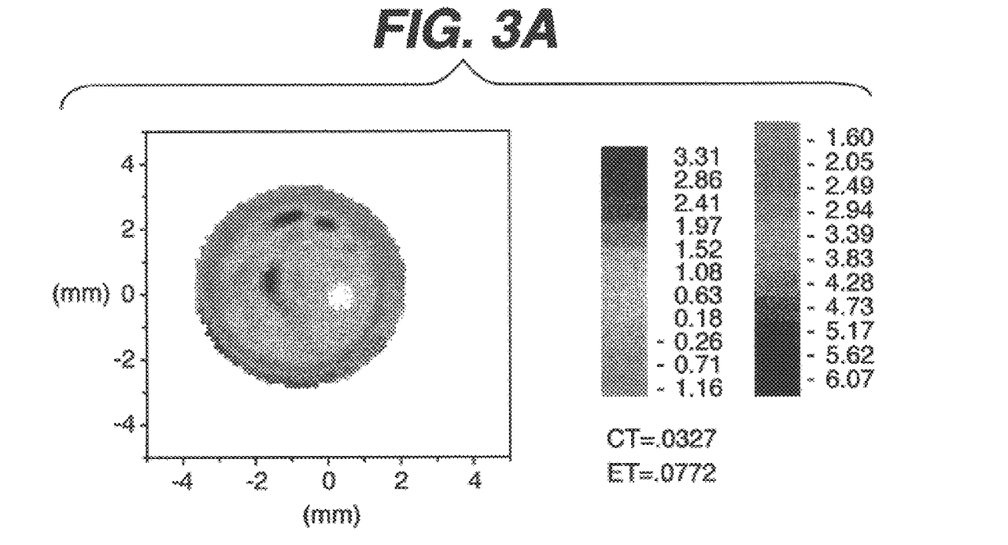
FIGS. 3A–3D illustrate the "print through" associated with a series of progressively thicker lenses.
Figure 3B:
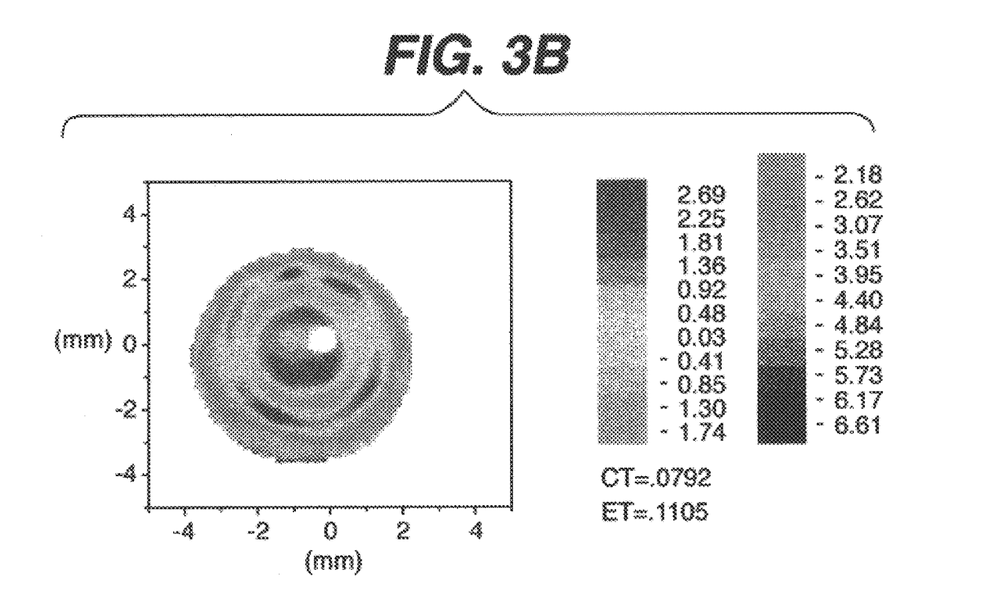
Figure 3C:
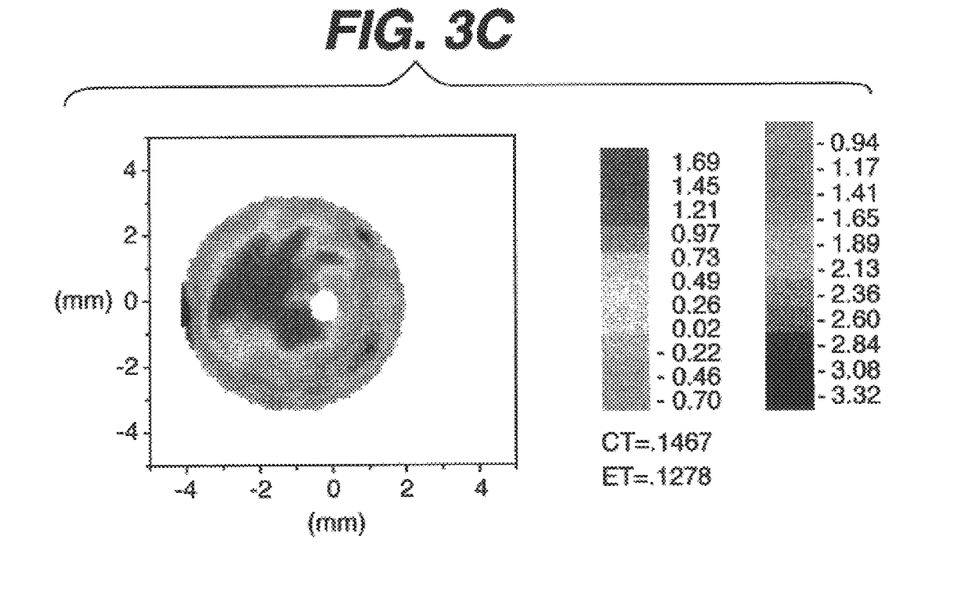
Figure 3D:
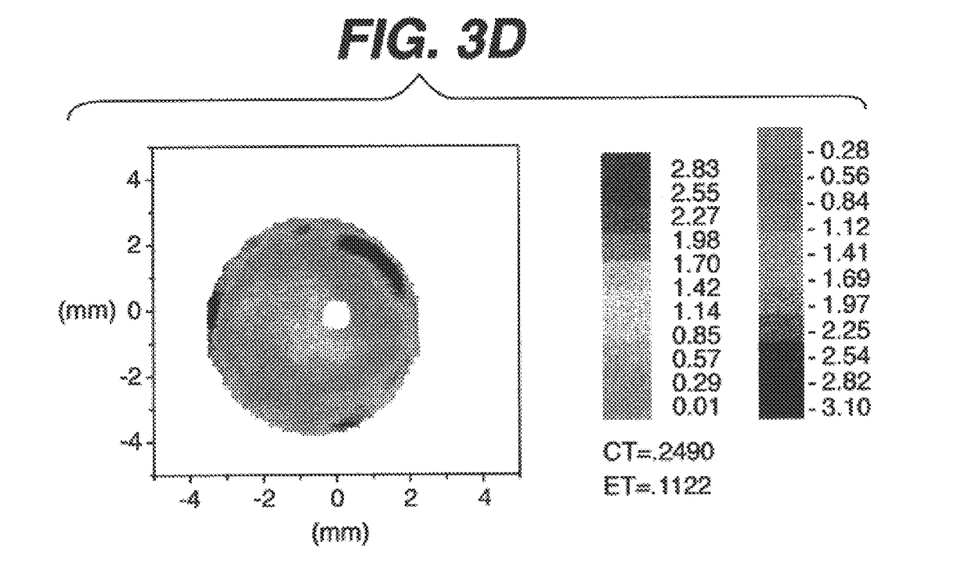

Referring now to FIGS. 2A–2D, therein is illustrated a sequence of diagrams depicting various amounts of "print through" observed on lenses with the same back surface pattern, but with progressively increasing thickness. The lens in FIG. 2A is the thinnest lens, while the lens in FIG. 2D is the thickest lens. FIGS. 2A–2D illustrate the loss of "print through" as the lens thickness increases. As shown in the thin lens of FIG. 2A, a substantial amount of "print through" is observable, in comparison with the thickest lens of FIG. 2D, in which minimal "print through" is observable. FIGS. 3A–3D illustrate a similar sequence of "print through" in progressively thicker lenses, with FIG. 3A being the thinnest lens and FIG. 3D being the thickest lens.

While several embodiments and variations of the present invention for a method of designing and fitting multifocal contact lenses taking into account material parameters are described in detail herein, it should be apparent that the disclosure and teachings of the present invention will suggest many alternative designs to those skilled in the art.

What is claimed is:

1. A method of fitting a multifocal ophthalmic lens having a front surface and a back surface, the back surface including a predefined pattern corresponding to an optical add power, the method comprising the following steps:

placing a lens on a cornea of a patient;

determining an amount of print through of said back surface pattern at said front surface; and optionally modifying the back surface pattern in accordance with said determined print through.

2. The method of claim 1, wherein said determining step includes the step of using a corneal topographer.

3. The method of claim 1, wherein said determining step includes the step of determining a change in lens topography on the front surface of the lens as a result of a change in lens topography on the back surface of the lens.

4. The method of claim 1, further comprising the step of determining whether said print through is greater than a first predetermined amount.

5. The method of claim 1, further comprising the step of determining whether said print through is less than a second predetermined amount.

6. The method of claim 4, wherein if said print through is greater than said first predetermined amount, then said modifying step includes the step of adjusting the add power of said lens.

7. The method of claim 6, wherein said step of adjusting the add power includes the step of increasing the add power.

8. The method of claim 6, wherein said step of adjusting the add power includes the step of decreasing the add power.

9. The method of claim 5, wherein if said print through is less than said second predetermined amount, then said modifying step includes the step of biasing said lens for distance vision.

10. The method of claim 5, wherein if said print through is less than said second predetermined amount, then said modifying step includes the step of biasing said lens for near vision.

11. The method of claim 5, wherein if said print through is less than said second predetermined amount, then said modifying step includes the step of biasing said lens for a combination of distance and near vision.

12. The method of claim 4, further comprising the step of determining whether said print through is less than a second determined amount.

13. The method of claim 12, wherein said first predetermined amount is substantially equal to said second predetermined amount.

14. The method of claim 12, wherein said first predetermined amount is greater than said second predetermined amount.

15. A method of fitting a pair of multifocal ophthalmic lenses, each having a front surface and a back surface, each of the back surfaces including a corresponding predefined pattern corresponding to an optical add power for each said lens, the method comprising the following steps:

placing a respective one of each said pair of lenses on a respective cornea of a patient;

for each said lens, performing at least one of the following two steps:
  (a) determining whether the print through of said back surface pattern at said front surface is greater than a first predetermined amount:
  (b) determining whether the print through of said back surface pattern at said front surface is less than a second predetermined amount;

for each said lens, if the corresponding print through is greater than said first predetermined amount, then modifying said lens to adjust the add power of said lens;

for each said lens, if the corresponding print through is less than said second predetermined amount, then modifying said lens to bias said lens for one of distance, near, and a combination of distance and near visions.

16. The method of claim 15, wherein said first predetermined amount is substantially equal to said second predetermined amount.

17. The method of claim 15, wherein said first predetermined amount is greater than said second predetermined amount.

\* \* \* \* \*